United States Patent
Jennings et al.

(12)
(10) Patent No.: US 6,774,168 B2
(45) Date of Patent: Aug. 10, 2004

(54) ADHESION PROMOTING SURFACE TREATMENT OR SURFACE CLEANER FOR METAL SUBSTRATES

(75) Inventors: Robert E. Jennings, Ellwood City, PA (US); David N. Walters, Slippery Rock, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 218 days.

(21) Appl. No.: 09/990,492

(22) Filed: Nov. 21, 2001

(65) Prior Publication Data

US 2003/0109613 A1 Jun. 12, 2003

(51) Int. Cl.[7] ............................. C08K 5/09; C08K 5/52; C08L 61/04
(52) U.S. Cl. ..................... 524/284; 524/127; 524/261; 524/291; 524/594; 528/144
(58) Field of Search ................. 524/594, 261, 524/284, 291, 127; 528/144

(56) References Cited

U.S. PATENT DOCUMENTS

| | | | |
|---|---|---|---|
| 4,614,777 A | 9/1986 | Kania | 526/279 |
| 4,702,962 A | * 10/1987 | Kojo et al. | 428/418 |
| 4,879,345 A | 11/1989 | Connelly et al. | 525/104 |
| 5,178,956 A | 1/1993 | Rychwalski et al. | 428/458 |
| 5,306,526 A | 4/1994 | Gray et al. | 427/309 |
| 5,468,802 A | 11/1995 | Wilt et al. | 524/539 |
| 5,837,656 A | 11/1998 | Sinclair et al. | 507/220 |
| 6,001,949 A | * 12/1999 | Kurimoto et al. | 528/129 |
| 6,025,026 A | 2/2000 | Smith et al. | 427/316 |
| 6,028,133 A | 2/2000 | Peek et al. | 524/276 |
| 6,114,491 A | 9/2000 | Dupre et al. | 528/129 |
| 6,126,776 A | 10/2000 | Glejb | 156/307.1 |
| 6,133,403 A | * 10/2000 | Gerber | 528/218 |

* cited by examiner

Primary Examiner—Tae H. Yoon
(74) Attorney, Agent, or Firm—Donald R. Palladino

(57) ABSTRACT

A coating composition comprising a phenolic resin, an alkoxy silane, and an acid. The coating composition of the present invention promotes adhesion between a multiple layer coating composition and a substrate and between the respective layers of the multiple layer coating composition.

22 Claims, No Drawings

ADHESION PROMOTING SURFACE TREATMENT OR SURFACE CLEANER FOR METAL SUBSTRATES

FIELD OF THE INVENTION

The present invention relates to compositions and methods for treating a substrate to promote adhesion, particularly compositions and methods for treating substrates that contain multiple layers of coating compositions.

BACKGROUND

It is difficult to formulate coating compositions that can adequately adhere to various substrates like untreated steel, galvanized steel and aluminum because different substrates have widely varying surface properties. Primers can be applied to a substrate in order to increase the ability of a coating composition to adhere to the substrate, but a single primer is usually not effective on different types of substrates.

A conversion coating can be applied to a substrate in order to improve a coating composition's ability to adhere to the substrate. Conversion coatings which deposit as a microthin coating and react with the substrate come in two types. The first and most common type is an aqueous solution of strong mineral acids which enhances adhesion by chemically reacting with the metallic substrates in a process called "etching". A drawback of aqueous conversion coatings is that it is difficult to uniformly apply one over a substrate.

The second type of conversion coating is a dispersion in organic solvents. For optimum performance, this type of conversion coating often contains heavy metal pigments such as strontium chromate. The negatives of conversion coatings dispersed in organic solvents are twofold. First, they are not effective on a wide range of substrates. Second, they are hazardous to the environment because they often contain heavy metal pigments.

The present invention provides a coating composition that promotes adhesion between a multiple layer coating composition and a substrate and between the respective layers of the multiple layer coating composition. Further, the coating composition of the present invention is easy to apply, can be used on various substrates, and is not harmful to the environment.

SUMMARY OF THE INVENTION

The present invention is a coating composition comprising a phenolic resin, an alkoxy silane, and an acid.

The present invention is also a method for coating a substrate comprising the following steps:
a. applying a controlled thickness of a coating composition comprising a phenolic resin, an alkoxy silane, and an acid;
b. optionally applying a primer coating over the coating applied in step (a); and
c. a topcoat over the coating applied in step (a) or in optional step (b).

DETAILED DESCRIPTION OF THE INVENTION

The present invention is directed to a coating composition capable of promoting adhesion between a multiple layer coating composition and a substrate, especially aluminum, and between the respective layers of the multiple layer coating composition when applied at a very low film thickness. The coating composition of the present invention comprises a phenolic resin. Phenolic resins, commonly referred to as phenoplasts, can be prepared by the condensation of a phenol or an alkyl substituted phenol with an aldehyde. Suitable phenols include, but are not limited to, monohydric phenols like cresol and xylenol and polyhydric phenols like resorcinol. Suitable aldehydes include, but are not limited to, formaldehyde, acetaldehyde, butyraldehyde and furfuraldehyde.

Suitable phenolic resins and methods for preparing them are disclosed in U.S. Pat. No. 6,028,133 issued to Peek and U.S. Pat. No. 6,114,491 issued to Dupre. Commercially available phenolic resins like GPRI BLS2700 from Georgia Pacific Corporation, Methylon 75108 from Occidental Chemical Corp., and Phenodur PR 263 from Vianova Resins, Inc. can be used in the present invention.

The aromaticity of the phenolic resin ranges from about 0 to 80 percent or 15 to 65 percent. The aromaticity can be determined by IR spectrophotometry if not supplied by the vendor. The phenolic resin is present in an amount ranging from about 0.1 to 99.8 percent where percents are based on the total resin solids weight of the coating composition.

The invention also includes an alkoxysilane. Preferred alkoxysilanes are acryloxyalkoxysilanes like gamma-acryloxypropyltrimethoxysilane and methacrylatoalkoxysilanes like gamma-methacryloxypropyltrimethoxysilane, gamma-methacryloxypropyltriethoxysilane and gamma-methacryloxypropyltris (2-methoxyethoxy)silane. Due to its greater reactivity, gamma-methacryloxypropyltrimethoxysilane is especially preferred.

Other suitable alkoxysilanes include vinyl alkoxysilanes, ethylenically unsaturated acyloxysilanes, mercapto functional silanes, amino functional silanes, and epoxy functional silanes. Exemplary vinyl alkoxysilanes include vinyltrimethoxysilane, vinyltriethoxysilane and vinyltris(2-methoxyethoxy) silane. Exemplary ethylenically unsaturated acyloxysilanes include acrylato-, methacrylato- and vinyl-acetoxysilanes like vinylmethyldiacetoxysilane, acrylatopropyltriacetoxysilane, and methacrylatopropyltriacetoxysilane. Exemplary mercapto functional silanes include gamma-mercaptopropyltrimethoxysilane, gamma-mercaptopropyltriethoxysilane, and gamma-mercaptopropyltrisopropoxysilane. Exemplary amino functional silanes include bis-(gamma-trimethoxysilylpropyl) amine, N-phenyl-gamma-amino propyltrimethoxysilane, and cyclohexyl-gamma-aminopropyltrimethoxysilane. Exemplary epoxy functional silanes include beta-(3,4-epoxycyclohexyl)ethyltrimethoxysilane and gamma-glycidoxypropyltrimethoxysilane.

The alkoxysilanes may be polymeric like an acrylic polymer containing a plurality of alkoxysilane groups. Alkoxysilane functional acrylic polymers can be prepared by copolymerizing various ethylenically unsaturated alkoxy functional monomers such as the acryloxysilanes mentioned above with other ethylenically unsaturated monomers via solution polymerization techniques in the presence of suitable initiators. The polymerization is carried out in an organic solution utilizing techniques which are well known in the art. Examples of alkoxysilane functional acrylic polymers are disclosed in U.S. Pat. No. 4,614,777.

The alkoxysilanes of the present invention have a molecular weight ranging from about 136 to 50,000 or from about 136 to 600.

The coating composition of the present invention further comprises an acid. One suitable acid is tannic acid or tannin.

Tannins are extracted from various plants and trees which can be classified according to their chemical properties as (a) hydrolyzable tannins, (b) condensed tannins, and (c) mixed tannins containing both hydrolyzable and condensed tannins. Preferred tannin materials useful in the present invention are those that contain a tannin extract from naturally occurring plants and trees, and are normally referred to as vegetable tannins. Suitable vegetable tannins include the crude, ordinary or hot-water-soluble condensed vegetable tannins. Quebracho and mimosa are the preferred condensed vegetable tannins. Other vegetable tannins include mangrove, spruce, hemlock, gabien, wattles, catechu, uranday, tea, larch, myrobalan, chestnut wood, divi-divi, valonia, summac, chinchona, oak, etc. These vegetable tannins are not pure chemical compounds with known structures, but rather contain numerous components including phenolic moieties such as catechol, pyrogallol, etc., condensed into a complicated polymeric structure.

An example of another suitable acid is phosphoric acid. The phosphoric acid can be a 100 percent orthophosphoric acid, superphosphoric acid or the aqueous solutions thereof, such as 85 percent phosphoric acid solution. Typically, aqueous phosphoric acid solutions which are about 70 to 90 percent phosphoric acid are used.

The amount of acid typically used in the practice of the present invention ranges from about 0.1 to 99.8 percent where percents are based on total weight of resin solids.

Optionally, the coating composition of the present invention can include solvents, rheological agents, and pigments. Suitable solvents include aromatic petroleum distillates like toluene, xylene, and aromatic blends commercially available from Exxon Corporation like SOLVESSO 100 and SOLVESSO 150; aliphatic solvents like cyclohexane and naphtha's; ketone solvents like acetone, methyl ethyl ketone, methyl isobutyl ketone, and methyl amyl ketone; alcohols like ethyl alcohol, propyl alcohol, and diacetone alcohol; mono- and dialkyl ethers of ethylene and diethylene glycol like ethylene glycol monoethyl ether, ethylene glycol monobutyl ether, ethylene glycol monoethyl ether acetate, diethylene glycol monobutyl ether, and diethylene glycol diethyl ether.

Because the coating composition of the present invention is a universal pretreatment, it can be used on a variety of substrates such as cold rolled steel (CRS), electrogalvanized steel (EG), and aluminum (AL).

The coating composition of the present invention can be applied in the following manner. First, clean the substrate to remove any dirt, grease, or machine oils that may be present on the substrate before applying the coating composition. A suitable cleaning agent is DX330, which is commercially available from PPG Industries, Inc. After the substrate is cleaned, it can be sanded. Although sanding is not required, it can lead to enhanced adhesion performance. Lastly, apply the coating composition.

Typically, the coating composition of the present invention is packaged as two separate components which are mixed prior to application. The components are typically formulated such that they are mixed 1:1 by volume and then applied to the substrate. One method for applying the coating composition involves wetting a clean towel with the coating composition and then lightly wiping the substrate using the towel to remove excess coating. The composition can also be applied via spray with an air supplied spray gun or a garden spray type apparatus. If the coating composition is sprayed on, it is recommended that the substrate be wiped down with a clean towel or a towel wetted with pretreatment to remove excess coating.

The applied coating film should be a very thin, transparent film. The dry film thickness is typically no more than approximately 0.1 mils. Typically, the dry film thickness is in the range of 0.01 to 0.1 mils.

After the coating composition of the present invention is applied, the coating can receive a primer coating followed by a topcoat layer or receive a topcoat without a primer coating. Examples of suitable primer coatings are described in U.S. Pat. No. 5,468,802. The dry film thickness of the primer layer generally ranges from about 0.5 to 5 mils, and the dry film thickness of the topcoat layer generally ranges from about 1 to 5 mils.

The present invention provides for enhanced adhesion of multiple layers of coatings to a variety of substrates and to each other.

EXAMPLES

The present invention will now be illustrated by the following non-limiting examples. Various coating compositions of the present invention and other comparative compositions were prepared for the purposes of testing. The various coating compositions are denoted as Examples 1 through 10. Tables 1 through 11 summarize the adhesion performance of the exemplarary coating compositions and a control on various substrates both sanded and unsanded over varying periods of time.

The Coating Compositions

The Example compositions utilized in the present invention were prepared in the following manner. The numbers which appear below are weight percentages based on the total weight of the composition.

Example 1

To prepare Example 1, tannic acid was dissolved in a mixture of methyl ethyl ketone, ethanol, and xylene. A phenolic resin solution which is commercially available as GPRI BLS2700 from Georgia Pacific Corporation was then added to the solution. The phenolic resin was a condensate of phenol with a resin solids content of 56% in ethanol and a 55% aromaticity. The specific makeup of the composition is as follows:

| | |
|---|---|
| GPRI BLS2700 | 16.273% |
| Tannic acid | 0.090% |
| Methyl ethyl ketone | 49.691% |
| Ethanol | 24.845% |
| Xylene | 8.282% |

Example 2

Example 2 was comprised of two components which were combined immediately prior to application. To prepare the first component, tannic acid was dissolved in a mixture of methyl ethyl ketone, ethanol, and xylene. To prepare the second component, a gamma-glycidoxypropyl-trimethoxyl silane which is commercially available as Silquest A-187 from OSi Specialties, Inc. was diluted with a solvent mixture of methyl ethyl ketone, ethanol, xylene, and 1,4, pentanedione. The first component and second component, respectively, were made up as follows.

| FIRST COMPONENT | |
| --- | --- |
| Tannic acid | 1.0% |
| Methyl ethyl ketone | 5.4% |
| Ethanol | 2.7% |
| Xylene | 0.9% |

| SECOND COMPONENT | |
| --- | --- |
| Silquest A-187 | 9% |
| Methyl ethyl ketone | 52% |
| Ethanol | 26% |
| Xylene | 9% |
| 1,4,pentanedione | 4% |

Example 3

Example 3 was comprised of two components which were combined immediately prior to application. To prepare the first component, GPRI BLS-2700 was diluted in a solvent mixture of methyl ethyl ketone, ethanol, and xylene. To prepare the second component, Silquest A-187 was diluted within a solvent mixture of methyl ethyl ketone, ethanol, xylene, and 1,4 pentanedione. The first component and the second component, respectively, were made up as follows.

| FIRST COMPONENT | |
| --- | --- |
| GPRI BLS-2700 | 18% |
| Methyl ethyl ketone | 49% |
| Ethanol | 25% |
| Xylene | 8% |

| SECOND COMPONENT | |
| --- | --- |
| Silquest A-187 | 9% |
| Methyl ethyl ketone | 52% |
| Ethanol | 26% |
| Xylene | 9% |
| 1,4 pentanedione | 4% |

Example 4

Example 4 was comprised of two components which were combined immediately prior to application. To prepare the first component, tannic acid was dissolved in a solvent mixture of methyl ethyl ketone, ethanol, and xylene. GPRI BLS-2700 was then added to complete the solution. To prepare the second component, Silquest A-187 was diluted with a solvent mixture of methyl ethyl ketone, ethanol, xylene, and 1,4 pentanedione. The first component and the second component, respectively, were made up as follows.

| FIRST COMPONENT | |
| --- | --- |
| GPRI BLS-2700 | 16% |
| Tannic acid | 1% |

-continued

| FIRST COMPONENT | |
| --- | --- |
| Methyl ethyl ketone | 50% |
| Ethanol | 25% |
| Xylene | 8% |

| SECOND COMPONENT | |
| --- | --- |
| Silquest A-187 | 9% |
| Methyl ethyl ketone | 52% |
| Ethanol | 26% |
| Xylene | 9% |
| 1,4 pentanedione | 4% |

Example 5

Example 5 was comprised of two components which were combined immediately prior to application. To prepare the first component, an 85% phosphoric acid aqueous solution was diluted in a solvent mixture of methyl ethyl ketone, ethanol, and xylene. Then GPRI BLS-2700 was added to the solution. To prepare component 2, Silquest A-187 was diluted with a solvent mixture of methyl ethyl ketone, ethanol, xylene, and 1,4 pentanedione. The first component and the second component, respectively, were made up as follows.

| FIRST COMPONENT | |
| --- | --- |
| GPRI BLS-2700 | 16% |
| 85% phosphoric acid aqueous solution | 1% |
| Methyl ethyl ketone | 50% |
| Ethanol | 25% |
| Xylene | 8% |

| SECOND COMPONENT | |
| --- | --- |
| Silquest A-187 | 9% |
| Methyl ethyl ketone | 52% |
| Ethanol | 26% |
| Xylene | 9% |
| 1,4 pentanedione | 4% |

Example 6

Example 6 was comprised of two components which were combined immediately prior to application. To prepare the first component, citric acid was dissolved in methanol. A solvent mixture of methyl ethyl ketone, ethanol, and xylene was then added to the solution. Lastly, GPRI BLS-2700 was added to the solution. To prepare the second component, Silquest A-187 was diluted in a solvent mixture of methyl ethyl ketone, ethanol, xylene, and 1,4 pentanedione. The first component and the second component, respectively, were made up as follows.

| FIRST COMPONENT | |
| --- | --- |
| Citric acid | 1% |
| Methanol | 8% |
| Methyl ethyl ketone | 45% |
| Ethanol | 22% |
| Xylene | 7% |
| GPRI BLS-2700 | 16% |

| SECOND COMPONENT | |
| --- | --- |
| Silquest A-187 | 9% |
| Methyl ethyl ketone | 52% |
| Ethanol | 26% |
| Xylene | 9% |
| 1,4 pentanedione | 4% |

Example 7

Example 7 was comprised of two components which were combined immediately prior to application. To prepare the first component, a vinyl resin commercially available as UCAR Solution Vinyl Resin VAGH from Union Carbide Chemicals and Plastics Co. Inc. and tannic acid were dissolved in mixture of methyl ethyl ketone, ethanol, and xylene. GPRI BLS-2700 was added to the solution. To prepare the second component, Silquest A-187 was diluted in a solvent mixture of methyl ethyl ketone, ethanol, xylene, and 1,4-pentanedione. The first component and the second component, respectively, were made up as follows.

| FIRST COMPONENT | |
| --- | --- |
| GPRI BLS-2700 | 15% |
| UCAR Solution Vinyl Resin VAGH | 1% |
| Tannic Acid | 1% |
| Methyl ethyl ketone | 50% |
| Ethanol | 25% |
| Xylene | 8% |

| SECOND COMPONENT | |
| --- | --- |
| Silquest A-187 | 9% |
| Methyl ethyl ketone | 52% |
| Ethanol | 26% |
| Xylene | 9% |
| 1,4 pentanedione | 4% |

Example 8

Example 8 was comprised of two components which were combined immediately prior to application. To prepare the first component, tannic acid was dissolved in mixture of methyl ethyl ketone, ethanol, and xylene. A phenolic resin, which is commercially available as Methylon 75108 from Occidental Chemical Corp., was added to the solution. Methylon 75108 was a condensate of 3-chloro-1-propene phenol with a resin solids content of 100% and a 24% aromaticity. To prepare the second component, Silquest A-187 was diluted in a solvent mixture of methyl ethyl ketone, ethanol, xylene, and 1,4 pentanedione. The first component and the second component, respectively, were made up as follows.

| FIRST COMPONENT | |
| --- | --- |
| Tannic acid | 1% |
| Methyl ethyl ketone | 54% |
| Ethanol | 27% |
| Xylene | 9% |
| Methylon 75108 | 9% |

| SECOND COMPONENT | |
| --- | --- |
| Silquest A-187 | 10% |
| Methyl ethyl ketone | 53% |
| Ethanol | 26% |
| Xylene | 9% |
| 1,4 pentanedione | 2% |

Example 9

Example 9 was comprised of two components which were combined immediately prior to application. To prepare the first component, tannic acid was dissolved in mixture of methyl ethyl ketone, ethanol, and xylene. A phenolic resin, which is commercially available as Phenodur PR 263 from Vianova Resins, Inc., was added to the solution. Phenodur PR 263 was a condensate of phenol with a number average molecular weight of 780, a solids content of 70% in butanol, and 20% aromaticity. To prepare the second component, Silquest A-187 was diluted in a solvent mixture of methyl ethyl ketone, ethanol, xylene, and 1,4 pentanedione. The first component and the second component, respectively, were made up as follows.

| FIRST COMPONENT | |
| --- | --- |
| Tannic acid | 1% |
| Methyl ethyl ketone | 52% |
| Ethanol | 26% |
| Xylene | 9% |
| Phenodur PR 263 | 13% |

| SECOND COMPONENT | |
| --- | --- |
| Silquest A-187 | 10% |
| Methyl ethyl ketone | 51% |
| Ethanol | 26% |
| Xylene | 9% |
| 1,4 pentanedione | 4% |

Example 10

Example 10 was comprised of two components which were combined immediately prior to application. To prepare the first component, tannic acid was dissolved in a solvent mixture of methyl ethyl ketone, ethanol, and xylene. GPRI BLS-2700 was then added to complete the solution. To prepare the second component, Silquest A-187 was diluted with a solvent mixture of methyl ethyl ketone, ethanol, xylene, and 1,4 pentanedione. The first component and the second component, respectively, were made up as follows.

| FIRST COMPONENT | |
|---|---|
| GPRI BLS-2700 | 16% |
| Tannic acid | 1% |
| Methyl ethyl ketone | 50% |
| Ethanol | 25% |
| Xylene | 8% |

| SECOND COMPONENT | |
|---|---|
| Silquest A-187 | 9% |
| Methyl ethyl ketone | 52% |
| Ethanol | 26% |
| Xylene | 9% |
| 1,4 pentanedione | 4% |

Preparation of the Coated Substrates

The coating compositions of the present invention were tested on the following substrates; electrogalvanized substrates, cold rolled steel substrates, and aluminum substrates. The electrogalvanized, cold rolled steel, and aluminum substrates are commercially available as APR18661, APR10288, and APR19081 or APR10326, respectively, from ACT Laboratories, Inc.

Both sanded and unsanded substrates were tested. The sanding was done with 180 grit sandpaper which is commercially available as 3M Stikit Gold Disc Roll from 3M Corporation.

Substrates coated with the Example compositions 1–6 were prepared as follows. The substrate was initially wiped with a lint-free tissue soaked with a cleaner/degreaser which is commercially available as DX330 from PPG Industries, Inc. The substrate was then allowed to air dry. The components of the specific Examples were mixed at equal volumes and applied to both a sanded and an unsanded side of the substrate. The coating composition was applied by wetting a lint-free tissue which is commercially available as Precision Wipes from Kimberly Clark Corporation and then lightly wiping the substrate with the lint-free tissue. After an approximately five minute flash, the coated substrate was primed with a polyisocyanate primer-sealer which is commercially available as K36 Sealer from PPG Industries, Inc. After one hour, a polyisocyanate cured topcoat which is commercially available as Concept 9300 from PPG Industries, Inc. was applied to the primed substrate.

Substrates coated with Example 7 were prepared as follows. A panel (commercially available as APR22986 from ACT Laboratories, Inc.) coated with a cationic electrocoat (ED 5000 from PPG Industries, Inc.) was cleaned using a lint-free tissue soaked with DX330. The substrate was allowed to dry, and the components of Example 7 were mixed together at equal volumes. A lint-free tissue was then wetted with the coating composition and lightly wiped over the substrate. After an approximately five minute flash, the coated substrate was primed with a two component primer-surfacer which is commercially available as UNIPRIME D8042/D8240. One hour later, the primed substrate was coated with Concept 9300.

Substrates coated with Examples 8 and 9 were prepared as follows. The electrogalvanized and cold rolled steel substrates were mechanically sanded with 180 grit paper. The aluminum substrates were not sanded.

Next, the substrate was wiped with a lint-free tissue soaked with DX330. Then, the specific coating composition was mixed at equal volumes. A lint-free tissue was wetted with the example coating and lightly wiped over the substrate. After a five minute flash, the coated substrate was primed with K36 Sealer. One hour later, the substrate was coated with Concept 9300.

Substrates coated with Example 10 were prepared as follows. The substrate was initially wiped with a lint-free tissue soaked with a cleaner/degreaser which is commercially available as DX330 from PPG Industries, Inc. The substrate was then allowed to air dry. The components of the specific Example were mixed at equal volumes and applied to sanded substrate. The coating composition was applied by wetting a lint-free tissue which is commercially available as Precision Wipes from Kimberly Clark Corporation and then lightly wiping the substrate with the lint-free tissue. After an approximately five minute flash, the coated substrate was topcoated with a polyisocyanate crosslinked alkyd topcoat which is commercially available as AUE300/AUE301 from PPG Industries, Inc.

Testing of the Coated Substrates

After 24 hours, all of the prepared substrates were evaluated for adhesion using ASTM D3359, Method B. The substrates were rated according to the percentage of coating retention.

One week later, the substrates were evaluated again. This time duplicate substrates were used. One panel was tested as described above and the other after being exposed for 96 hours to 100 percent humidity at 100° F. The substrates were visually inspected for blisters.

The results for each of the Example coatings and a control (substrate primed with K36 sealer and, one hour later, coated with Concept 9300; the coating composition of the present invention was not applied) appear below in Tables 1–11

TABLE 1

The Performance of Example 1

| Substrate | % Adhesion after 24 hours | % Adhesion after 1 week | % Adhesion after 96 hours at 100% humidity | Blistering |
|---|---|---|---|---|
| APR18661-Sanded EG | 60 | 0 | 0 | N |
| APR10288-Sanded CRS | 40 | 0 | 0 | N |
| APR19081-Sanded Al | 10 | 0 | 0 | N |
| APR18661-Unsanded EG | 100 | 20 | 0 | N |
| APR10288-Unsanded CRS | 90 | 0 | 0 | N |
| APR19081-Unsanded AL | 65 | 0 | 0 | N |

TABLE 2

The Performance of Example 2

| Substrate | % Adhesion after 24 hours | % Adhesion after 1 week | % Adhesion after 96 hours at 100% humidity | Blistering |
|---|---|---|---|---|
| APR18661-Sanded EG | 100 | 100 | 100 | N |
| APR10288-Sanded CRS | 100 | 100 | 100 | N |
| APR19081-Sanded Al | 100 | 100 | 100 | N |
| APR18661-Unsanded EG | 100 | 100 | 100 | N |
| APR10288-Unsanded CRS | 100 | 100 | 100 | N |
| APR19081-Unsanded AL | 100 | 100 | 0 | N |

TABLE 3

The Performance of Example 3

| Substrate | % Adhesion after 24 hours | % Adhesion after 1 week | % Adhesion after 96 hours at 100% humidity | Blistering |
|---|---|---|---|---|
| APR 18661-Sanded EG | 100 | 100 | 100 | N |
| APR10288-Sanded CRS | 100 | 100 | 100 | N |
| APR19081-Sanded Al | 25 | 95 | 100 | N |
| APR18661-Unsanded EG | 100 | 100 | 82 | N |
| APR10288-Unsanded CRS | 95 | 100 | 0 | N |
| APR19081-Unsanded AL | 0 | 0 | 0 | Y |

TABLE 4

The Performance of Example 4

| Substrate | % Adhesion after 24 hours | % Adhesion after 1 week | % Adhesion after 96 hours at 100% humidity | Blistering |
|---|---|---|---|---|
| APR18661-Sanded EG | 100 | 100 | 100 | N |
| APR10288-Sanded CRS | 100 | 100 | 100 | N |
| APR19081-Sanded Al | 100 | 100 | 100 | N |
| APR18661-Unsanded EG | 100 | 100 | 100 | N |
| APR 10288-Unsanded CRS | 100 | 100 | 100 | N |
| APR19081-Unsanded AL | 100 | 100 | 95 | N |

TABLE 5

The Performance of Example 5

| Substrate | % Adhesion after 24 hours | % Adhesion after 1 week | % Adhesion after 96 hours at 100% humidity | Blistering |
|---|---|---|---|---|
| APR18661-Sanded EG | 100 | 100 | 100 | N |
| APR10288-Sanded CRS | 100 | 100 | 100 | N |
| APR19081-Sanded Al | 100 | 100 | 0 | Y |
| APR18661-Unsanded EG | 100 | 100 | 100 | N |
| APR10288-Unsanded CRS | 100 | 100 | 100 | N |
| APR19081-Unsanded AL | 95 | 90 | 95 | N |

TABLE 6

The Performance of Example 6

| Substrate | % Adhesion after 24 hours | % Adhesion after 1 week | % Adhesion after 96 hours at 100% humidity | Blistering |
|---|---|---|---|---|
| APR18661-Sanded EG | 90 | 60 | 100 | N |
| APR10288-Sanded CRS | 95 | 95 | 0 | N |
| APR19081-Sanded Al | 100 | 75 | 100 | N |
| APR 18661-Unsanded EG | 100 | 95 | 100 | N |
| APR10288-Unsanded CRS | 100 | 100 | 0 | Y |
| APR19081-Unsanded AL | 55 | 45 | 0 | Y |

TABLE 7

The Performance of Example 7

| Substrate | % Adhesion after 24 hours | % Adhesion after 1 week | % Adhesion after 96 hours at 100% humidity | Blistering |
|---|---|---|---|---|
| APR22986-Unsanded ED 5000 | 100 | 100 | 95 | N |

TABLE 8

The Performance of Example 8

| Substrate | % Adhesion after 24 hours | % Adhesion after 1 week | % Adhesion after 96 hours at 100% humidity | Blistering |
|---|---|---|---|---|
| APR18661-Sanded EG | 100 | 100 | 100 | N |
| APR 10288-Sanded CRS | 100 | 100 | 100 | N |
| APR19081-Unsanded Al | 0 | 0 | 0 | Y |

TABLE 9

The Performance of Example 9

| Substrate | % Adhesion after 24 hours | % Adhesion after 1 week | % Adhesion after 96 hours at 100% humidity | Blistering |
|---|---|---|---|---|
| APR18661-Sanded EG | 100 | 100 | 100 | N |
| APR10288-Sanded CRS | 100 | 100 | 100 | N |
| APR19081-Unsanded Al | 100 | 100 | 0 | Y |

TABLE 10

Comparison of the Adhesion Performance of Substrates Coated with Example 10 and the Same Substrates without the Coating

| | % Adhesion after 1 week | % Adhesion after 96 hours at 100% humidity | Blistering |
|---|---|---|---|
| Substrates Coated with Example 10 | | | |
| APR10288-Sanded CRS | 100 | 100 | N |
| APR10326-Sanded Al | 100 | 100 | N |
| Same Substrates without the Coating | | | |
| APR10288-Sanded CRS | 85 | 80 | N |
| APR10326-Sanded Al | 0 | 0 | Y |

TABLE 11

Performance of the Control[1]

| Substrate | % Adhesion after 24 hours | % Adhesion after 1 week | % Adhesion after 96 hours at 100% humidity | Blistering |
|---|---|---|---|---|
| APR18661-Sanded EG | 0 | 0 | 0 | N |
| APR10288-Sanded CRS | 100 | 90 | 85 | N |
| APR19081-Sanded Al | 0 | 0 | 0 | Y |
| APR18661-Unsanded EG | 0 | 0 | 0 | N |
| APR10288-Unsanded CRS | 100 | 0 | 0 | N |
| APR19081-Unsanded AL | 0 | 0 | 0 | Y |

[1] The various substrates were primed with K36 sealer and, one hour later, coated with Concept 9300; the coating composition of the present invention was not applied.

Conclusion

Regardless of the type of substrate, maximum adhesion is achieved when a coating composition comprising a phenolic, and an alkoxy silane, and an acid is applied.

What is claimed:

1. A coating composition comprising a mixture of:
   a. a first component comprising a phenolic resin, an acid, and a solvent; and
   b. a second component comprising an alkoxysilane,
   wherein the first component and the second component are mixed immediately prior to application of the composition to a substrate.

2. A coating composition according to claim 1 in which the alkoxy group of the alkoxysilane contains from 1 to 6 carbon atoms.

3. A coating composition according to claim 1 wherein said alkoxysilane is an epoxy functional alkoxysilane.

4. A coating composition according to claim 1 wherein said acid is selected from the group consisting of tannic acid, phosphoric acid, citric acid, and gallic acid and mixtures thereof.

5. A coating composition according to claim 1 wherein said phenolic resin is prepared by condensing a phenolic material with an aldehyde.

6. The coating composition of claim 5 wherein the phenolic material is phenol.

7. The coating composition of claim 5 wherein the aldehyde is formaldehyde.

8. A coating composition according to claim 1 wherein said phenolic resin has an aromaticity between 0 and 80 percent.

9. A coating composition according to claim 1 wherein said phenolic resin is present in an amount ranging from 0.1 to 99.8 percent by weight based on the total weight of the coating composition.

10. A coating composition according to claim 1 wherein said alkoxysilane is present in an amount ranging from 0.1 to 99.8 percent by weight based on the total weight of the coating composition.

11. A coating composition according to claim 1 wherein said acid is present in an amount ranging from 0.1 to 99.8 percent by weight based on the total weight of the coating composition.

12. A coating composition comprising a mixture of:
   a. a first component comprising from 0.1 to 99.8 percent by solid weight of a phenolic resin, from 0.1 to 99.8 percent by solid weight of an acid and a solvent; and
   b. a second component comprising from 0.1 to 99.8 percent by solid weight of an epoxy functional alkoxysilane;
   whereby the percents by weight are based on the total solid weight of the composition, and wherein the first component and the second component are mixed immediately prior to application of the composition to a substrate.

13. The coating composition of claim 12 wherein the alkoxy groups of the alkoxysilane contain from 1 to 6 carbon atoms.

14. The coating composition of claim 12 wherein the acid is selected from the group consisting of tannic acid, phosphoric acid, citric acid, and gallic acid and mixtures thereof.

15. The coating composition of claim 8 wherein the phenolic resin has an aromaticity between 15 and 80 percent.

16. A coating composition comprising a mixture of:
   a. a first component comprising from 0.1 to 99.8 percent by weight of a phenolic resin having an aromaticity between 15 and 80 percent, from 0.1 to 99.8 percent by weight of an acid selected from the group consisting of tannic, phosphoric, citric and gallic acids and mixtures thereof, and a solvent; and
   b. a second component comprising from 0.1 to 99.8 percent by weight of an epoxy functional silane in which the alkoxy groups contain from 1 to 6 carbon atoms,
   whereby the percents by weight are based on total solid weight of the composition, and wherein the first component and the second component are mixed immediately prior to application of the composition to a substrate.

17. The coating composition of claim 1, wherein the second component further comprises a solvent.

18. The coating composition of claim 1, wherein the phenolic resin, the alkoxysilane and the acid comprise no more than about 10 weight percent based on the total weight of the coating composition.

19. The coating composition of claim 1, wherein the alkoxysilane is selected from the group consisting of acryloxyalkoxysilanes, vinyl alkoxysilanes, ethylenically unsaturated acyloxysilanes, mercapto functional silanes, and amino functional silanes.

20. The coating composition of claim 17, wherein the amounts of phenolic resin, acid, and solvent in the first component and the amounts of the alkoxysilane and solvent in the second component are selected to result in an applied coating film with a dry film thickness of no more than about 0.1 mils.

21. The coating composition of claim 12, wherein the second component further comprises a solvent.

22. The coating composition of claim 16, wherein the second component further comprises a solvent.

* * * * *